United States Patent
Sugino et al.

(10) Patent No.: US 11,796,341 B2
(45) Date of Patent: Oct. 24, 2023

(54) INFORMATION PROCESSING DEVICE, INFORMATION PROCESSING SYSTEM, AND INFORMATION PROCESSING METHOD

(71) Applicant: HONDA MOTOR CO., LTD., Tokyo (JP)

(72) Inventors: Tsukasa Sugino, Wako (JP); Makoto Yamamura, Wako (JP); Takayuki Kawai, Wako (JP); Masaya Honji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/169,579

(22) Filed: Feb. 8, 2021

(65) Prior Publication Data
US 2021/0285789 A1   Sep. 16, 2021

(30) Foreign Application Priority Data

Mar. 11, 2020   (JP) ................................ 2020-041795

(51) Int. Cl.
  *G01C 21/00*   (2006.01)
  *G06T 7/70*   (2017.01)
  *G05D 1/02*   (2020.01)

(52) U.S. Cl.
  CPC ..... *G01C 21/3807* (2020.08); *G01C 21/3837* (2020.08); *G06T 7/70* (2017.01);
  (Continued)

(58) Field of Classification Search
  CPC .. G01C 21/3807; G01C 21/3837; G06T 7/70; G06T 2207/30242; G06T 2207/30261; G05D 1/0212
  (Continued)

(56) References Cited

U.S. PATENT DOCUMENTS

2005/0182518 A1   8/2005   Karlsson
2006/0089765 A1*  4/2006   Pack .................... G05D 1/0278
                                                    318/587
(Continued)

FOREIGN PATENT DOCUMENTS

EP           3218775       4/2019
JP           2001-260885   9/2001
(Continued)

OTHER PUBLICATIONS

German Office Action for German Patent Application No. 102021105002.2 dated Dec. 8, 2021.
(Continued)

*Primary Examiner* — Tyler J Lee
*Assistant Examiner* — Tiffany P Ohman
(74) *Attorney, Agent, or Firm* — AMIN, TUROCY & WATSON, LLP

(57) ABSTRACT

An information processing device includes: a processor configured to: collect monitoring information indicating circumstances of a monitoring area from a plurality of monitoring information acquiring units, detect an object which is located in the monitoring area on the basis of the monitoring information, update map information of the monitoring area using position information indicating a position of the object, and provide the map information to a working machine that performs predetermined work in the monitoring area.

12 Claims, 10 Drawing Sheets

(52) U.S. Cl.
    CPC .. *G05D 1/0212* (2013.01); *G06T 2207/30242* (2013.01); *G06T 2207/30261* (2013.01)

(58) Field of Classification Search
    USPC .............................................................. 701/1
    See application file for complete search history.

(56) References Cited

U.S. PATENT DOCUMENTS

| | | | |
|---|---|---|---|
| 2013/0317646 A1* | 11/2013 | Kimoto | G05B 19/425 700/250 |
| 2014/0074342 A1 | 3/2014 | Wong et al. | |
| 2016/0154408 A1 | 6/2016 | Eade et al. | |
| 2019/0171911 A1 | 6/2019 | Greenberg | |
| 2019/0227559 A1 | 7/2019 | Shirouzu et al. | |
| 2019/0250627 A1* | 8/2019 | Witt | G05D 1/0231 |

FOREIGN PATENT DOCUMENTS

| | | |
|---|---|---|
| JP | 5866728 | 2/2016 |
| JP | 2019-128743 | 8/2019 |
| JP | 2019-218035 | 12/2019 |
| WO | 2018/012439 A1 | 1/2018 |
| WO | 2018/179649 | 10/2018 |

OTHER PUBLICATIONS

Japanese Office Action for Japanese Patent Application No. 2020-041795 dated Sep. 12, 2023.

* cited by examiner

FIG. 11

INFORMATION PROCESSING DEVICE, INFORMATION PROCESSING SYSTEM, AND INFORMATION PROCESSING METHOD

CROSS-REFERENCE TO RELATED APPLICATION

Priority is claimed on Japanese Patent Application No. 2020-041795, filed Mar. 11, 2020, the content of which is incorporated herein by reference.

BACKGROUND OF THE INVENTION

Field of the Invention

The present invention relates to an information processing device, an information processing system, and an information processing method.

Description of Related Art

Machines that perform various types of work have spread with advances in automatic control technology. Such machines include a mobile object that travels autonomously in a predetermined work area, and are employed as working machines such as lawn mowers or scavenging machines. Each working machine independently stores map information, and position information of an object recognized as part of a traveling environment near its own position is included in the map information. Each working machine determines a moving route along which the working machine will travel to bypass a detected object on the basis of the map information in order to move safely. In the related art, the number of working machines that are operated at a time is generally one (for example, see Japanese Patent No. 5866728, PCT International Publication No. WO2018/012439, Japanese Unexamined Patent Application, First Publication No. 2001-260885, and Japanese Unexamined Patent Application, First Publication No. 2019-218035).

SUMMARY OF THE INVENTION

However, techniques in which a plurality of working machines operate in a predetermined monitoring area are expected. In such cases, each individual working machine generally manages its own map information, and use of map information shared by the plurality of machines has not been sufficiently considered. For example, when another working machine which is separated from a certain working machine detects a change in a traveling environment and cannot acquire information of a detected object, there is a likelihood that the certain working machine will determine a moving route on the premise that the object is not present. When the determined moving route passes through the position of the detected object, the object may block travel and become an obstacle. That is, a working machine cannot avoid an obstacle and thus safety thereof may decrease.

On the other hand, there is a likelihood that a working machine will determine a moving route to bypass an obstacle which was present in the past and has been currently removed. This may cause a decrease in work efficiency due to the unnecessary bypass. An object in a monitoring area is not necessarily located in the same place. For example, since a lost article such as a toy or a purse has a high likelihood of removal in a relatively short time, the necessity to avoid the area of such an object is low. On the other hand, when an object which has been registered is not detected due to erroneous determination or the like and a position thereof is immediately removed from map information, safety may decrease. This is because a position of an object which is potentially present is not considered at the time of determining a moving route as long as it is not registered again. That is, when a working machine travels on a moving route passing through a position of an object which is actually present, there is a likelihood that the working machine will not be able to avoid the object.

An aspect of the invention is made in consideration of the aforementioned circumstances and an objective thereof is to provide an information processing device, an information processing system, and an information processing method that do not decrease work efficiency and can secure safety.

In order to solve the aforementioned problem and to achieve the objective, the invention employs the following aspects.

(1) According to an aspect of the invention, there is provided an information processing device including: a collection unit configured to collect monitoring information indicating circumstances of a monitoring area from a plurality of monitoring information acquiring units; an object determining unit configured to detect an object which is located in the monitoring area on the basis of the monitoring information; a map information managing unit configured to update map information of the monitoring area using position information indicating a position of the object; and a map information providing unit configured to provide the map information to a working machine that performs predetermined work in the monitoring area.

(2) In the aspect of (1), the map information may include first map information and second map information, and the map information managing unit may be configured to add the position information of a newly detected object to the first map information, to determine a first probability of the object being successively detected at the same position, to copy the position information of an object for which the first probability is higher than a predetermined reference value for the first probability from the first map information to the second map information, to determine a second probability of the object not being successively detected at the same position, and to delete position information of an object for which the second probability is higher than a predetermined reference value for the second probability from the first map information.

(3) In the aspect of (2), the object determining unit may be configured to determine attributes of an object which is detected on the basis of the monitoring information, and the map information managing unit may be configured to determine the first probability or the second probability on the basis of the attributes.

(4) The information processing device according to the aspect of (3) may further include a work instructing unit configured to cause a predetermined working machine to remove the object when the object is a predetermined object to be removed.

(5) The information processing device according to the aspect of (3) or (4) may further include a notification unit configured to notify a predetermined working machine of notification information indicating at least a position of the object when the object is a predetermined notification object.

(6) The information processing device according to any one of the aspects of (2) to (5) may further include a notification unit configured to determine a quantity of an object which is detected in the monitoring area on the basis of the first map information and to output notification information indicating an abnormality of the quantity of the object when the quantity of the object is greater than a predetermined reference quantity.

(7) According to another aspect of the invention, there is provided an information processing system including: any one of the aspects of (1) to (6); and the plurality of monitoring information acquiring units, wherein each of two or more working machines includes one of the plurality of monitoring information acquiring units.

(8) In the aspect of (7), at least one of the plurality of monitoring information acquiring units may be an imaging unit configured to capture an image of the monitoring area.

(9) According to another aspect of the invention, there is provided an information processing method which is performed by an information processing device, the information processing method including: a collection step of collecting monitoring information indicating circumstances of a monitoring area from a plurality of monitoring information acquiring units; an object detecting step of detecting an object which is located in the monitoring area on the basis of the monitoring information; a map information managing step of updating map information of the monitoring area using position information indicating a position of the object; and a map information providing step of providing the map information to a working machine that performs predetermined work in the monitoring area.

According to the aspects of (1), (7), and (9), position information of an object having a likelihood of being present at the same position in the monitoring area is stored in the second map information and position information of an object which is temporarily present is stored in the first map information. Even when an object is not temporarily detected, the position information thereof is not immediately deleted from the map information. Accordingly, a likelihood of presence of the object is exhibited, and the likelihood of presence of the object is deleted when it is determined that the object is not present. As a result, it is possible to improve safety of a working machine that moves using the first map information and the second map information.

According to the aspect of (2), position information of an object having a likelihood of being successively present at the same position is stored in the second map information and position information of an object which is temporarily present is stored in the first map information. Even when an object is not temporarily detected, the position information thereof is not immediately deleted from the map information. Accordingly, a likelihood of presence of the object is exhibited, and the likelihood of presence of the object is deleted when it is determined that the object is not present. As a result, it is possible to improve safety of a working machine that moves using the first map information and the second map information.

According to the aspect of (3), a likelihood that an object will be present successively at the same position or a likelihood that the object will not be present successively at the same position is evaluated depending on a type of the object. Accordingly, map information is updated on the basis of the likelihood of presence or absence of an object depending on the type of the object.

According to the aspect of (4), when an object to be removed is detected, the object is removed. Accordingly, since a position from which the object has been removed is restored as a candidate for a moving route of a working machine, it is possible to improve work efficiency of the working machine.

According to the aspect of (5), notification information indicating a position of a predetermined notification object is delivered to a user of a machine who is a notification recipient. Since the user who is a notification recipient can understand the notification information of the object detected at the position, it is possible to improve work efficiency associated with management of a monitoring area.

According to the aspect of (6), notification information indicating an abnormality of a quantity of an object detected in the monitoring area is delivered to a user of a machine who is a notification recipient (for example, a manager). Since the user who is a notification recipient can understand the abnormality of the quantity of the object in a monitoring area, it is possible to improve work efficiency associated with management of a monitoring area.

According to the aspect of (8), it is possible to analyze circumstances of a monitoring area in more detail using an image captured in the monitoring area without referring to the monitoring information which is provided from the monitoring information acquiring unit of a working machine.

BRIEF DESCRIPTION OF THE DRAWINGS

FIG. 11 is a diagram illustrating an example of a work instruction from the information processing device according to the third embodiment.

DETAILED DESCRIPTION OF THE INVENTION

First Embodiment

Hereinafter, a first embodiment of the invention will be described with reference to the accompanying drawings.

Figure 1:
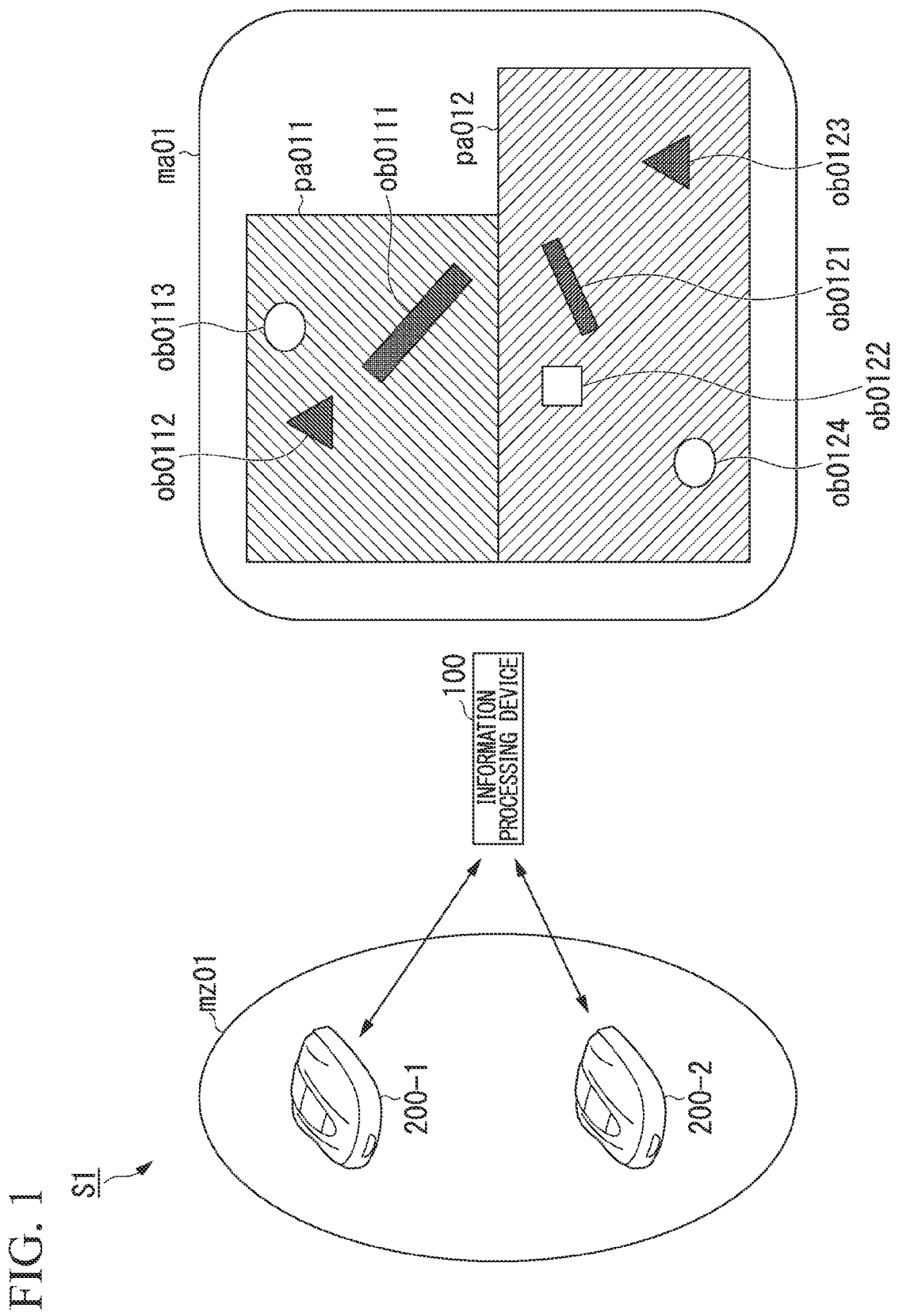
FIG. 1 is a diagram schematically illustrating an information processing system according to a first embodiment.

FIG. 1 is a diagram schematically illustrating an information processing system 51 according to the first embodiment.

The information processing system 51 sets an area in which there is a likelihood that a plurality of working machines 200 will travel as a monitoring area mz01 and manages map information ma01 spatially indicating circumstances of the monitoring area as a traveling environment of the working machines 200. The plurality of working machines 200 are mobile working machines 200 that can independently determine moving routes thereof using map information (route scheduling) and travel along the determined moving routes. In the information processing system 51, the number of working machines 200 can be an arbitrary number equal to or greater than two. In the example illustrated in FIG. 1, the number of working machines 200 is two, and the individual working machines 200 are referred to by sub numbers such as 200-1 and 200-2 to distinguish them from each other. In the following description, it is assumed that the number of working machines is two, and the individual working machines 200 are not distinguished from each other unless otherwise mentioned when common details of the plurality of working machines 200 are described or when the individual working machines 200 do not need to be distinguished from each other.

A monitoring information acquiring unit which is provided in each working machine 200 acquires monitoring information indicating circumstances in a predetermined range from the monitoring information acquiring unit in the monitoring area mz01. The working machine 200 transmits the monitoring information acquired by the monitoring information acquiring unit to an information processing device 100. The information processing device 100 receives the monitoring information acquired by the monitoring information acquiring unit of the working machine 200. The information processing device 100 detects an object which can be present in the predetermined range from the monitoring information acquiring unit on the basis of the received monitoring information. The information processing device 100 updates the map information ma01 indicating a traveling environment in the monitoring area mz01 using position information indicating a position at which the object has been detected. Accordingly, position information of objects which are detected on the basis of the monitoring information acquired from the individual working machines 200 is integrated in the map information ma01. In the example illustrated in FIG. 1, the map information ma01 which is constructed by update represents a distribution of objects in a subarea pa011 based on the monitoring information which is provided from the working machine 200-1 and represents a distribution of objects in a subarea pa012 based on the monitoring information which is provided from the working machine 200-2.

The information processing device 100 provides the map information ma01 to the working machines 200. Each working machine 200 receives the map information ma01 from the information processing device 100 and performs route planning using the received map information ma01. The map information ma01 also includes information on a distribution of objects based on the monitoring information acquired by the working machine 200 which is separate from the corresponding working machine. The working machine 200 can acquire clues for avoiding objects detected on the basis of the monitoring information which has not been acquired by the corresponding working machine, and thus it is possible to secure safety.

Figure 4:
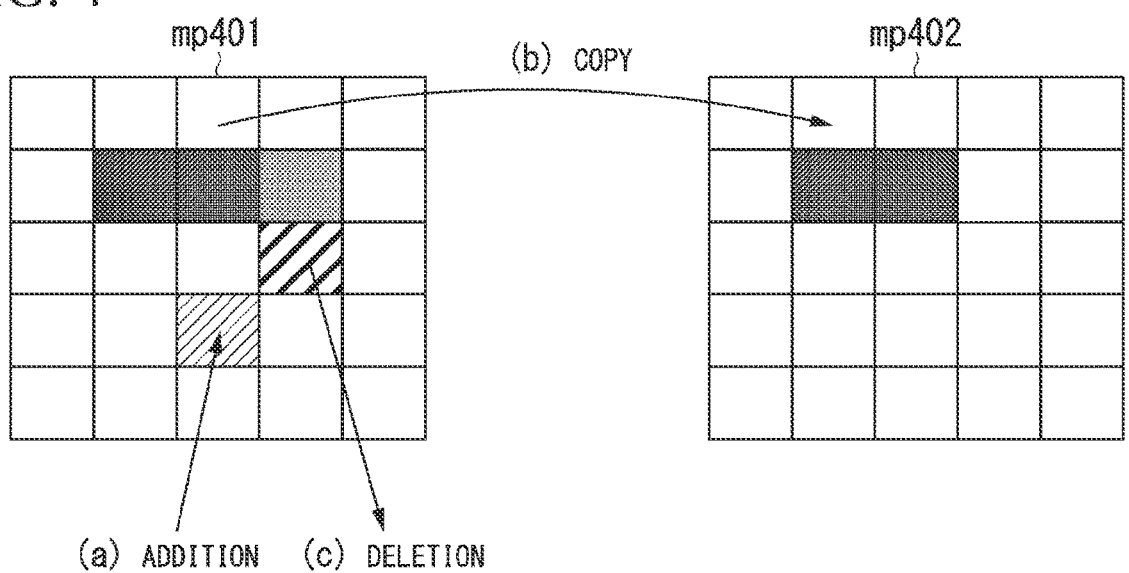
FIG. 4 is a diagram illustrating a map information updating process according to the first embodiment.

The map information ma01 formed in the information processing device 100 may include first map information (a temporary map) and second map information (an original map). The information processing device 100 adds position information of a newly detected object to the first map information and determines a first probability which is a probability of an object being successively detected at the same position for each object indicated by the first map information. The information processing device 100 determines the first probabilities for objects ob0111, ob0112, and ob0113 indicated by the map information ma01 illustrated in FIG. 1 and objects ob0121, ob0122, ob0123, and ob0124 indicated by the map information ma01. The first probability is determined, for example, on the basis of a period in which an object is successively present at the same position. The first probability may depend on attributes of an object. In FIG. 1, attributes of an object are represented by a shape of a figure and a presence period of the object is represented by a dot density in the figure. The information processing device 100 copies position information of an object for which the determined first probability is higher than a predetermined reference value for the first probability (hereinafter referred to as a first reference value) from the first map information to the second map information (FIG. 4).

The information processing device 100 determines a second probability which is a probability of an object not being successively detected at the same position for the object which is no longer detected. The information processing device 100 deletes position information of an object for which the second probability is higher than a predetermined reference value for the second probability (hereinafter referred to as a second reference value) from the first map information (FIG. 4). The second probability is determined, for example, on the basis of a period in which an object is not successively present at the same position. The second probability may also depend on attributes of the object.

Each working machine 200 is provided with the map information from the information processing device 100 and performs route planning using the position information of the objects indicated by the map information. The map information which is provided to the working machines 200 includes position information of objects in the monitoring area based on the monitoring information acquired from the monitoring information acquiring unit which is separate from the monitoring information acquiring unit provided in the corresponding working machine. The working machine 200 can acquire clues for determining a moving route to avoid such objects, and thus safety is secured. Position information of an object which is temporarily present but which has a likelihood of removal is included in the first map information and thus clues for avoidance are secured. On the other hand, when it has been determined that the object is no longer present, the position information is deleted from the first map information and thus it is possible to avoid unnecessary bypass of an object which is not present. Accordingly, it is possible to achieve safety of the working machines 200 and to curb a decrease in work efficiency.

(Information Processing Device)

An example of a hardware configuration of the information processing device 100 according to this embodiment will be described below.

Figure 2:
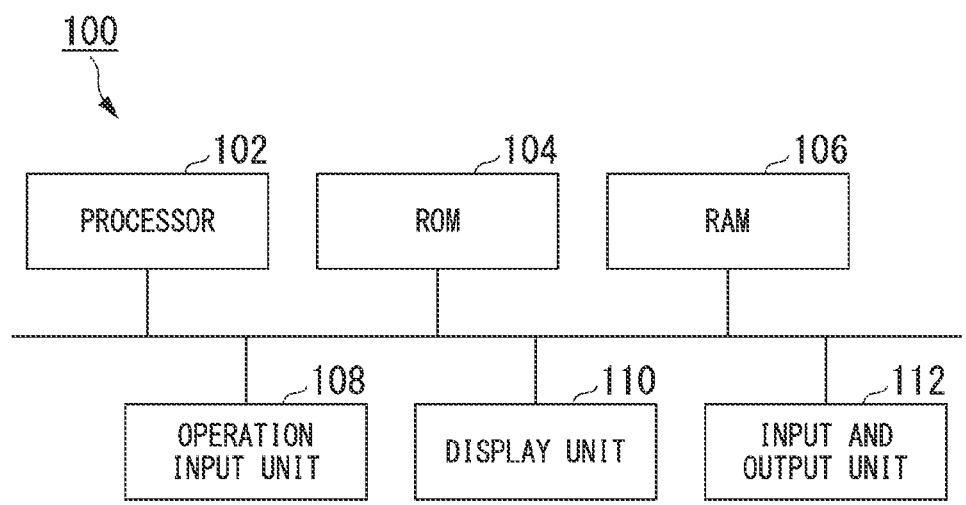
FIG. 2 is a block diagram schematically illustrating an example of a hardware configuration of an information processing device according to the first embodiment.

FIG. 2 is a block diagram schematically illustrating an example of a hardware configuration of the information processing device 100 according to this embodiment. The information processing device 100 includes a computer including a processor 102, a read only memory (ROM) 104, a random access memory (RAM) 106, an operation input unit 108, a display unit 110, and an input and output unit 112. The processor 102, the ROM 104, the RAM 106, the operation input unit 108, the display unit 110, and the input and output unit 112 are connected to each other such that various types of data can be input and output.

The processor 102 controls operations of the information processing device 100, for example, by reading a program or various types of data stored in the ROM 104 and executing the program. The processor 102 is, for example, a central processing unit (CPU).

In the invention, execution of processes as instructed by various types of commands described in the program may be referred to as "execution of a program" or "executing a program."

The ROM 104 stores, for example, a program which is executed by the processor 102.

The RAM 106 serves as, for example, a work area in which various types of data and a program which are used in the processor 102 are temporarily stored.

The operation input unit 108 is an input device that receives a user's operation, generates an operation signal in response to the received operation, and outputs the generated operation signal to the processor 102. For example, the operation input unit 108 corresponds to a pointing device such as a mouse or a keyboard. In the invention, operating based on information indicated by an input operation signal may be simply referred to as "operating in response to an operation."

The display unit 110 includes, for example, a display that displays various types of display information on the basis of image data or the like input from the processor 102.

The input and output unit 112 can input and output various types of data to and from other devices in a wired or wireless manner. The input and output unit 112 includes, for example, an input and output interface that can enable input and output in accordance with a predetermined data input/output standard. The input and output unit 112 may include a communication module that accesses a network in a wired or wireless manner and enables transmission and reception of various types of data to and from other devices which are connected to the network.

Figure 3:
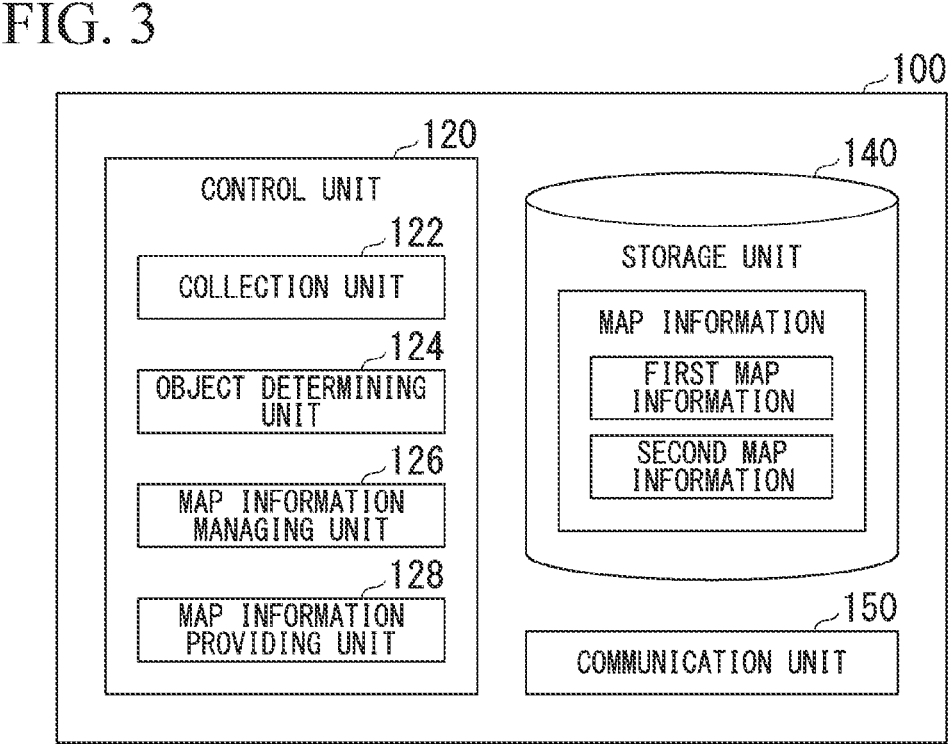
FIG. 3 is a block diagram illustrating an example of a functional configuration of the information processing device according to the first embodiment.

An example of a functional configuration of the information processing device 100 according to this embodiment will be described below. FIG. 3 is a block diagram illustrating an example of a functional configuration of the information processing device 100 according to this embodiment. The information processing device 100 includes a control unit 120, a storage unit 140, and a communication unit 150.

The control unit 120 performs various types of processes for realizing and controlling functions of the information processing device 100. The control unit 120 is realized by causing the processor 102 to execute a predetermined control program. The control unit 120 includes a collection unit 122, an object determining unit 124, a map information managing unit 126, and a map information providing unit 128.

The collection unit 122 collects monitoring information from the monitoring information acquiring units. Each monitoring information acquiring unit is, for example, a distance sensor 36 (which will be described later) which is provided in the corresponding working machine 200. The collection unit 122 receives distance information indicating a direction of an object detected by the distance sensor 36 in a predetermined range from the distance sensor 36 and a distance to the object as an example of the monitoring information. In the monitoring information which is received from a mobile monitoring information acquiring unit such as the monitoring information acquiring units of the working machines 200, position information indicating the position of the monitoring information acquiring unit is correlated with distance information indicating a distance of an object at that time. The collection unit 122 acquires the monitoring information at intervals of a predetermined time (for example, 20 ms to 1 s). The collection unit 122 outputs the collected monitoring information to the object determining unit 124.

The object determining unit 124 detects a distance and a direction of an object which is present in a predetermined range from the monitoring information acquiring unit on the basis of the distance information included in the monitoring information input from the collection unit 122. The object determining unit 124 can identify a position indicated by the position information correlated with the distance information as a reference point and determine the position at which the object is present from the distance and the direction detected from the identified reference point. The object determining unit 124 may identify an area which is surrounded by an outline including a series of curves which are a set of points and which is disposed at the determined position as an area occupied by the object and determine the points in the area as the position at which the object is present. The object determining unit 124 outputs object position information indicating the determined position at which the object is present to the map information managing unit 126.

The monitoring information which is received from a monitoring information acquiring unit with a fixed position may not include position information indicating the position of the monitoring information acquiring unit. In this case, the object determining unit 124 can determine the position at which the object is present using the distance and the direction detected from a reference point using a preset position of the monitoring information acquiring unit as the reference point.

The object determining unit 124 may determine a position which is distributed in a direction in which a distance of an object is not indicated by the distance information from the reference point as an absence position which is a position at which an object is not present. The object determining unit 124 may determine a position which is distributed in the same direction as the direction of the object to which the distance is indicated by the distance information from the reference point and at which the distance from the reference point is shorter than the distance indicated by the distance information as an absence position which is a position at which an object is not present. The object determining unit 124 may add information on the determined absence position to the object position information and output the object position information to the map information managing unit 126. The object determining unit 124 may determine whether an object is present for each grid cell (which will be described later) having a predetermined size which is a subarea of the monitoring area.

The map information managing unit 126 determines whether the object which is present at the position indicated by the object position information input from the object determining unit 124 is a new object with reference to the first map information stored in the storage unit 140. The first map information includes at least object presence information indicating whether the detected object is present for each element area (hereinafter referred to as each grid cell) which is subareas of the monitoring area. The object presence information which is set for each grid cell indicates a distribution in a two-dimensional space of the detected object. The object presence information indicating presence of an object may additionally include information on the object which is present in the grid cell such as date and time at which the object has been detected (hereinafter referred to as detection date and time). When object presence information of a grid cell associated with the position of the present object indicated by the object presence information indicates absence of an object for the grid cell, the map information managing unit 126 determines that the object is a new object. Regarding the object determined to be a new object, the map information managing unit 126 generates object presence information including presence of an object and detection date and time which is date and time at that time for a grid cell indicating the position of the object. The map information managing unit 126 updates the first map information mp401 by adding the object presence information generated for the grid cell to the first map information mp401 (addition of (a) in FIG. 4) and stores the updated first map information mp401 in the storage unit 140. When the object presence information of the grid cell indicates presence of an object, the map information managing unit 126 determines that the detected object is not a new object. The map information managing unit 126 does not update the first map information mp401 for the grid cell.

The map information managing unit 126 determines the first probability for each grid cell in which the object presence information indicating presence of an object is set on the basis of the first map information mp401 stored in the storage unit 140. The first probability is an index value indicating a degree of likelihood that an object will be successively present at the same position (grid cell). The map information managing unit 126 can determine that a period from the detection date and time indicated by the object presence information to that time point (the current time point) is a first period in which an object is successively present at that position as an example of the first probability. The map information managing unit 126 copies the object presence information for a grid cell in which the determined first period is greater than a preset first period (for example, several hours to several days) as position information indicating a position of an object which is present (copy of (b) in FIG. 4) and updates second map information by adding the object presence information to the second map information mp402 for the grid cell. Accordingly, the second map information mp402 represents an original map indicating a distribution of objects which is always present in the monitoring area. In order to avoid overlap of information between the first map information mp401 and the second map information mp402, the map information managing unit 126 may delete the object presence information set for the grid cell of the first map information mp401 which is a copy source of the object presence information to the second map information mp402.

When the object presence information included in the first map information mp401 for a grid cell corresponding to an absence position indicated by the object presence information input from the object determining unit 124 indicates presence of an object, the map information managing unit 126 determines that the object has been removed from the grid cell. The map information managing unit 126 changes the object presence information to object presence information including absence of an object in the grid cell and information on the date and time at which the object has been determined to be removed as removal date and time. The map information managing unit 126 updates the pre-change object presence information set in the first map information mp401 for the grid cell with post-change first map information mp401. Here, since the object presence information remains even after it has been changed for the grid cell, an ECU 42 (which will be described later) of the working machine 200 considers that the object has not been removed but is present in the grid cell, and performs route planning.

The object presence information included in the first map information mp401 for a grid cell corresponding to the absence position indicated by the object presence information input from the object determining unit 124 may indicate absence of an object. The map information managing unit 126 can determine that a period from the removal date and time indicated by the object presence information to the current time point is a second period as an example of the second probability. The map information managing unit 126 updates the first map information mp401 by deleting the object presence information for a grid cell in which the determined second period is greater than a preset second period (for example, several hours to several days) as position information indicating the position of the object which is present from the first map information mp401 (deletion of (c) in FIG. 4). Accordingly, after absence of the object which has been determined to be present is determined, the object presence information for the grid cell associated with the position of the object as position information indicating the position of the object is deleted from the first map information mp401. In other words, the first map information mp401 means a temporary map indicating a distribution of objects which is temporarily present in the monitoring area.

The map information providing unit 128 provides map information including the first map information and the second map information to the working machines 200. The map information providing unit 128 monitors the map information stored in the storage unit 140 and transmits the updated map information to the working machines 200 via the communication unit 150 when update of at least some grid cells in the map information is detected using the communication unit 150. The update corresponds to one of addition, change, and deletion or a combination thereof.

Instead of the time point at which the map information has been updated or in addition to the time point at which the map information has been updated, the map information providing unit 128 may read map information at that time point from the storage unit 140 when a map information request indicating a request for the map information is received from a specific working machine 200. The map information providing unit 128 transmits the read map information to the working machine 200 which is a transmission source of the map information request.

(Determination of Attributes)

The object determining unit 124 may determine attributes of a detected object. The object determining unit 124 determines an area occupied by an object as the size of the object for each detected object, for example, on the basis of the distance information and the position information. The size of an object may be expressed by the number of grid cells of an area occupied by the object. The monitoring information received by the collection unit 122 may include image data. The image data is, for example, data indicating an image which is captured by a camera 38 provided in a working machine 200. When monitoring information including image data is input from the collection unit 122, the object determining unit 124 may perform a known image recognition process on the input image data and determine whether an object is present at a position determined on the basis of distance information and position information. The object determining unit 124 can identify an orientation of the image of the object on the basis of visual field direction information (which will be described later) accessory to the image data. The object determining unit 124 may determine the size of the object on the basis of the recognized image of the object which has been determined to be present.

The object determining unit 124 may determine a type of an object as another example of attributes of an object. The object determining unit 124 can determine a type of an object determined to be present, for example, by performing a known image recognition process on input image data. The object determining unit 124 adds attribute information indicating attributes of an object determined to be present to object presence information and outputs the object presence information to the map information managing unit 126. The object determining unit 124 may add presence information indicating a determination result of presence of the object to object presence information and output the object presence information to the map information managing unit 126. The map information managing unit 126 may add attribute information included in the object presence information input from the object determining unit 124 to object presence information associated with an object determined to be a new object and add the object presence information to the first map information.

(Determination of First Probability and Second Probability)

An example in which the map information managing unit 126 determines the first period in which a newly detected object is successively present at the same position as the first probability and determines the second period in which an object is not successively present at that position as the second probability has been described above, but the invention is not limited thereto. The map information managing unit 126 may determine a first frequency in which a newly detected object is present at the same position as the first probability and determine a second frequency in which an object is not present at that position as the second probability. Then, the map information managing unit 126 may determine whether object presence information is to be added to the second map information by comparing the determined first frequency with a predetermined first frequency using the same method as that when the first period is used. The map information managing unit 126 can determine whether object presence information is to be deleted from the first map information by comparing the determined second frequency with a predetermined second frequency using the same method as that when the second period is used.

Here, the map information managing unit 126 updates the first map information such that object presence information indicating presence of an object and date and time of that time point for a grid cell indicating the position is added regardless of whether an object indicated by the object presence information input from the object determining unit 124 is a new object, and stores the updated first map information in the storage unit 140. Regarding a grid cell corresponding to an absence position indicated by the object presence information input from the object determining unit 124, the map information managing unit 126 updates the first map information such that object presence information indicating presence of an object and date and time of that time point for the grid cell indicating the position is added, and stores the updated first map information in the storage unit 140. Accordingly, object presence information indicating whether an object is present for each grid cell is accumulated in the first map information.

For example, for each grid cell for which object presence information indicating presence of a new object in a predetermined monitoring period (for example, several hours to several days) up to the current time point is stored, the map information managing unit 126 can count the number of pieces (the number of times) of object presence information indicating presence of an object in the monitoring period as the first frequency. The map information managing unit 126 can count the number of pieces of object presence information indicating absence of an object in the monitoring period as the second frequency.

For each grid cell for which object presence information indicating presence of a new object in the monitoring period is stored, the map information managing unit 126 may count a presence period in which an object is present on the basis of the object presence information in the monitoring period as the first frequency. The presence period can be calculated as a sum obtained by identifying a period with date and time indicated by object presence information in which absence of an object is changed to presence as a start point and with date and time indicated by object presence information in which presence of an object is changed to absence as an end point and sequentially summing the identified period. The map information managing unit 126 may count an absence period in which an object is not present in the monitoring period as the second frequency. The map information managing unit 126 can calculate the absence period as a sum obtained by identifying a period with date and time indicated by object presence information in which presence of an object is changed to absence as a start point and with date and time indicated by object presence information in which absence of an object is changed to presence as an end point and summing the identified period.

For each grid cell for which object presence information indicating presence of a new object in the monitoring period is stored, the map information managing unit 126 may calculate a presence probability in which an object is present on the basis of the object presence information in the monitoring period as the first frequency. The map information managing unit 126 can calculate the presence probability by dividing the presence period determined using the aforementioned method by the monitoring period. The map information managing unit 126 may calculate an absence probability in which an object is not present in the monitoring period as the second frequency. The map information managing unit 126 can calculate the absence probability by dividing the absence period determined using the aforementioned method by the monitoring period.

The map information managing unit 126 may determine one or both of the first probability and the second probability with further reference to attribute information included in object presence information input from the object determining unit 124. For example, the map information managing unit 126 can determine a predetermined first parameter and a predetermined second parameter corresponding to a type of an object indicated by the attribute information with reference to attribute constant data indicating correspondence between preset attributes of an object and the first parameter and the second parameter. The map information managing unit 126 can adjust the first probability by multiplying the determined first parameter by the first probability, and use the adjusted first probability to determine whether the object presence information is to be added to the second map information. The map information managing unit 126 can adjust the second probability by multiplying the determined second parameter by the second probability, and use the adjusted second probability to determine whether the object presence information is to be deleted from the first map information.

When the size of an object is included as attributes, for example, positive values which become greater as the size of an object becomes greater can be determined as the first parameter and the second parameter. In general, this is because, as an object becomes larger, it is more difficult to move the object, movement of the object such as installation or removal is less likely to be caused, and it is possible to more reliably determine whether an object is present.

When a type of an object is included as attributes, for example, positive values which are relatively greater than that of another type of object can be determined as the first parameter and the second parameter for an object with a high likelihood of being a lost article such as a toy or a purse, an object which floats easily such as a dead leaf or a paper sheet, or an object which falls easily such as a minute component. This is because movement of such objects can be frequently caused. On the other hand, for example, positive values which are relatively small than that of another type of object can be determined as the first parameter and the second parameter for a tree, a structure, a building, or an accessory thereto. This is because movement of such objects is not conceivable in a normal usage state thereof.

The map information managing unit 126 may determine one or both of the first probability and the second probability with further reference to presence information included in the object presence information input from the object determining unit 124. For example, the map information managing unit 126 may determine the first probability for a grid cell of an object for which the presence information indicates that the object is present such that it is higher than the first probability for a grid cell of an object for which the presence information indicates that the object is not present. For example, the map information managing unit 126 may adjust the first probability by multiplying the first probability which is determined as the first probability for a grid cell of an object for which the presence information indicates that the object is present using the aforementioned method by a predetermined positive parameter which is less than 1.

For example, the map information managing unit 126 may determine the second probability for a grid cell of an object for which the presence information indicates that the object is not present such that it is higher than the second probability for a grid cell of an object for which the presence information indicates that the object is present. For example, the map information managing unit 126 can adjust the second probability by multiplying the second probability which is determined as the second probability for a grid cell of an object for which the presence information indicates that the object is not present by a predetermined positive parameter which is less than 1.

(Working Machine)

Figure 5:
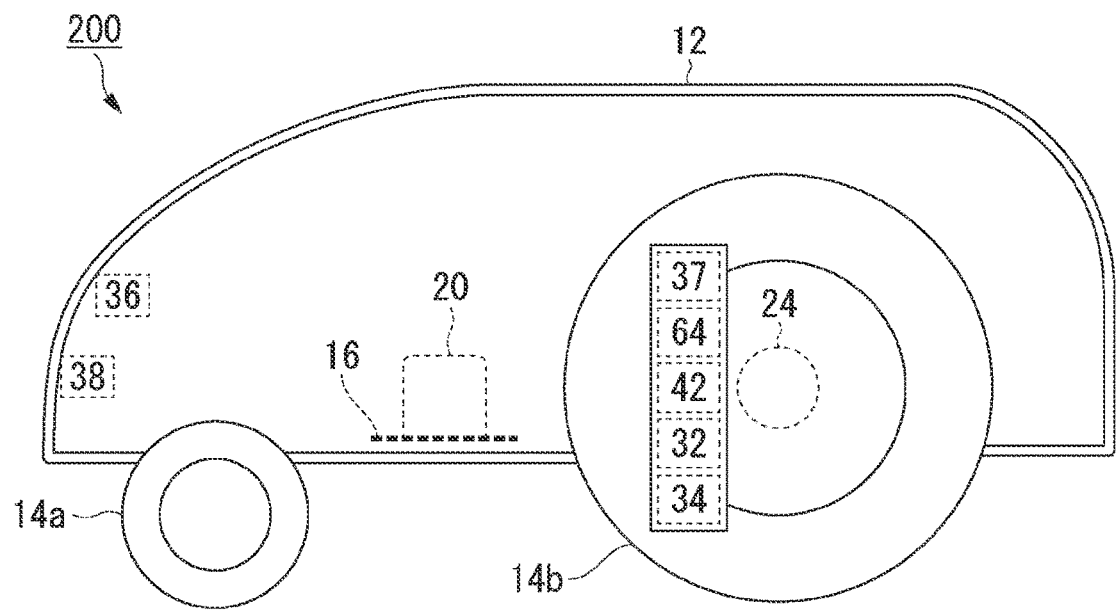
FIG. 5 is a side view illustrating an example of a working machine according to the first embodiment.
Figure 6:
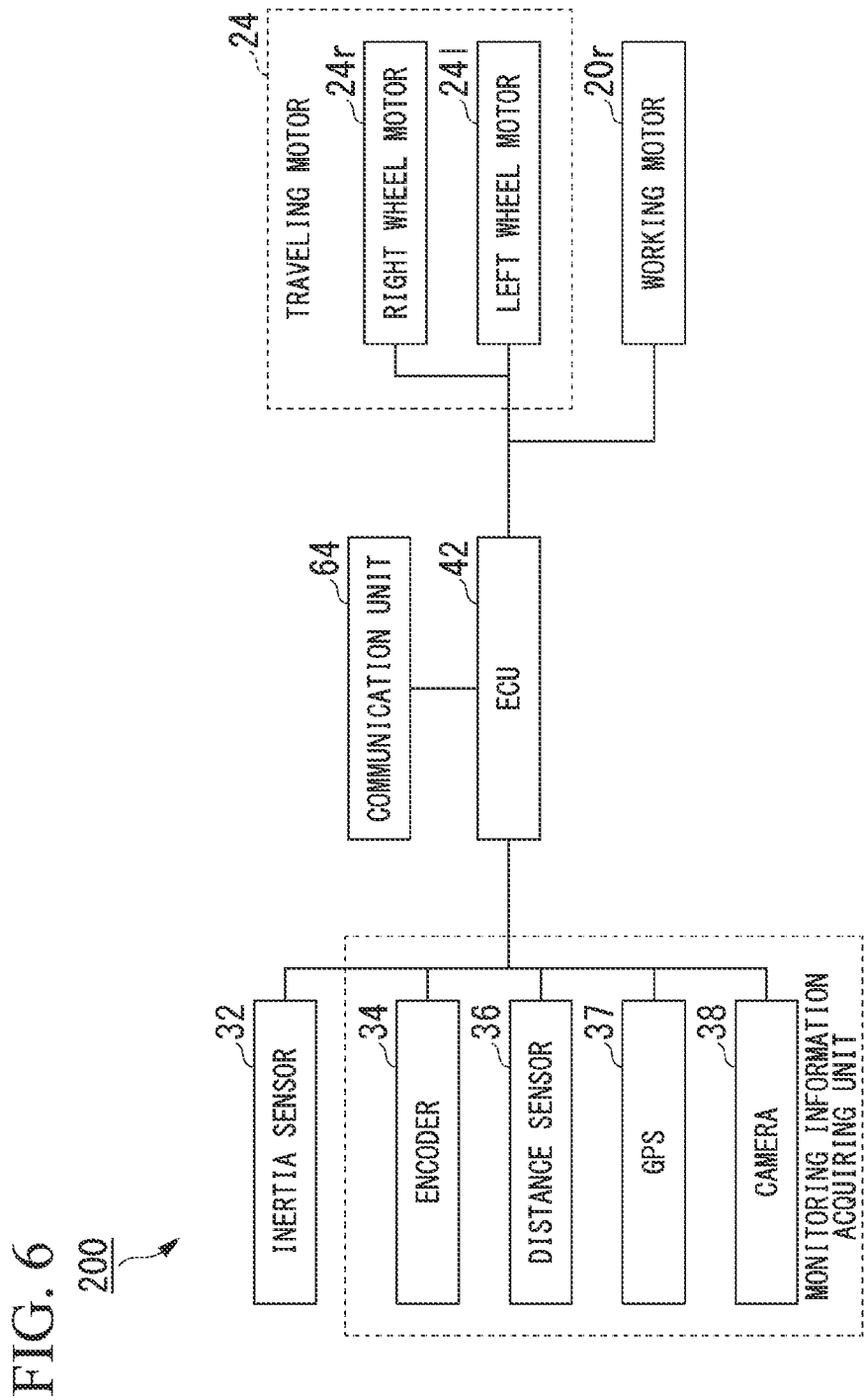
FIG. 6 is a block diagram illustrating an example of a functional configuration of a working machine according to the first embodiment.

An example of a working machine 200 according to this embodiment will be described below. FIG. 5 is a side view illustrating an example of a working machine according to this embodiment. FIG. 6 is a block diagram illustrating an example of a functional configuration of a working machine according to this embodiment.

The working machine 200 illustrated in FIG. 5 is a mobile electric lawn mower. The working machine 200 includes a front wheel 14a, a rear wheel 14b, a traveling motor 24, and an electronic control unit (ECU) 42. The ECU 42 is a microcomputer including a processor and a storage medium and performs processes for realizing functions of the working machine 200 or control thereof. The front wheel 14a and the rear wheel 14b are provided on the right and left sides in a longitudinal direction of a vehicle body 12. The rear wheels 14b provided on the right and left sides are referred to as a right wheel and a left wheel. The traveling motor 24 includes a left wheel motor 24l and a right wheel motor 24r. The left wheel motor 24l and the right wheel motor 24r can cause the working machine 200 to move by rotating the right wheel and the left wheel under the control of the ECU 42. A working motor 20 trims grass such as lawn extending from the ground surface to cross a cutter blade 16 by rotating the cutter blade 16 attached to the bottom surface of the vehicle body 12 under the control of the ECU 42. The working machine 200 includes a communication unit 64.

The ECU 42 additionally controls an inertia sensor 32, an encoder 34, a distance sensor 36, a GPS 37, and a camera 38. The inertia sensor 32 measures a direction and an acceleration of the inertia sensor and outputs inertia sensor information indicating the measured direction and the measured acceleration to the ECU 42. The encoder 34 detects rotation speeds of the right wheel and the left wheel. The encoder 34 outputs movement state information indicating the detected rotation speeds to the ECU 42. The encoder 34 may sequentially calculate a traveling speed and a traveling direction of the working machine 200 on the basis of the detected rotation speeds. The encoder 34 can calculate the position of the working machine 200 at the known current time point by integrating the calculated traveling speed in the traveling direction until they reach the traveling speed and the traveling direction at the current time point. The encoder 34 may employ a position which is represented by latitude and longitude notified from the GPS 37 as a position of a reference point. The encoder 34 outputs position information indicating the calculated position to the ECU 42.

The distance sensor 36 measures a distance to a nearby object from the position of the distance sensor. The distance sensor 36 includes, for example, a light detection and ranging unit (LIDAR). The LIDAR measures a distance to an object for each direction in which laser beams are radiated on the basis of a phase difference between a laser beam emitted from the LIDAR and a laser beam reflected by the surface of the object reflecting the laser beam. The distance sensor 36 outputs distance information indicating the distance to the object for each measuring direction to the ECU 42.

The GPS 37 measures latitude and longitude indicating the position of the GPS on the basis of a difference in arrival time between reference signals which are transmitted from at least three GPS satellites circulating around the earth. The GPS 37 converts the measured latitude and longitude to a position which is expressed by two-dimensional coordinate values in a coordinate system of a map indicated by the map data and may notify the encoder 34 of position information indicating the converted position or output the position information to the ECU 42.

The camera 38 captures an image in a visual field thereof and outputs image data indicating the captured image to the ECU 42. The camera 38 may be provided in a mobile member for making the visual field thereof variable in a horizontal plane. The camera 38 may output visual field direction information indicating the visual field direction of the camera to the ECU 42 in correlation with the image data indicating an image captured at that time point.

The encoder 34, the distance sensor 36, the GPS 37, and the camera 38 correspond to the monitoring information acquiring unit. The ECU 42 transmits the distance information input from the distance sensor 36 as monitoring information to the information processing device 100 using the communication unit 64. The ECU 42 may add the image data input from the camera 38 to the monitoring information or may add the position information input from the encoder 34 or the GPS 37 to the monitoring information.

A flow of processes which are performed by the ECU 42 will be described below. The ECU 42 functions as an autonomous movement control device for controlling movement of the working machine 200. The ECU 42 receives map information which is wirelessly transmitted from the information processing device 100 using the communication unit 64 and stores the received map information. The ECU 42 may receive map information which is autonomously transmitted from the information processing device 100, or may transmit a map information request to the information processing device 100 using the communication unit 64 and receive map information from the information processing device 100 as a response to the map information request.

The ECU 42 determines a moving route to a target point with a position at the current time point (a current position) indicated by the position information input from the encoder 34 or the GPS 37 as a starting point with reference to the map information stored in the ECU. The ECU 42 determines the moving route with a lowest movement cost from the starting point to a predetermined target point using a known route search method such that grid cells for which object presence information is set in one or both of the first map information and the second map information are avoided. For example, an A* algorithm can be used as the route search method. In general, the movement cost can increase as a length along the route from the starting point to the target point increases, increase as a degree or frequency of change in direction increases, and increase as a frequency of acceleration or deceleration increases. The ECU 42 may not exclude a grid cell in which a type of an object indicated by object presence information of the first map information is a type of a specific object of which traveling is permitted from candidates for the moving route. As the type of a specific object of which traveling is permitted, for example, traveling instruction information indicating a type of an object not serving as an obstacle of traveling such as a dead leaf and a paper sheet for each grid cell can be set in advance in the ECU 42. The second map information may include object presence information indicating whether there is a known object which is always located for each grid cell. The ECU 42 may store a topological map indicating traveling instruction information for instructing a traveling state for each grid cell in advance. As the traveling state, for example, information such as a moving speed, stop, and a moving direction is instructed. The ECU 42 determines the movement cost under constraints based on such setting information. The target point may be set by executing a predetermined working application program or may be set in accordance with a user's operation or an operation signal which is received from the user's terminal.

Then, the ECU 42 determines a target translational speed and a target turning speed as a target speed at each time point from the current position indicated by the position information to the target position. Regarding a target direction at each time point, a ratio of the target translational speed and the target turning speed corresponds to the target direction at that time point and a square sum of the target translational speed and the target turning speed corresponds to a square value of the target speed. For example, the ECU 42 determines the target translational speed and the target turning speed such that the target speed is maintained at a predetermined speed, and the ECU 42 determines target rotational speeds of the right wheel and the left wheel on the basis of the determined target translational speed and the determined target turning speed and controls rotational speeds of the left wheel motor 24*l* and the right wheel motor 24*r* such that an axle of the left wheel and an axle of the right wheel rotate at the determined target rotational speed. The ECU 42 controls electric power which is supplied to the left wheel motor 24*l* and the right wheel motor 24*r* to reach the target rotational speeds of the left wheel and the right wheel.

(Information Providing Process)

Figure 7:
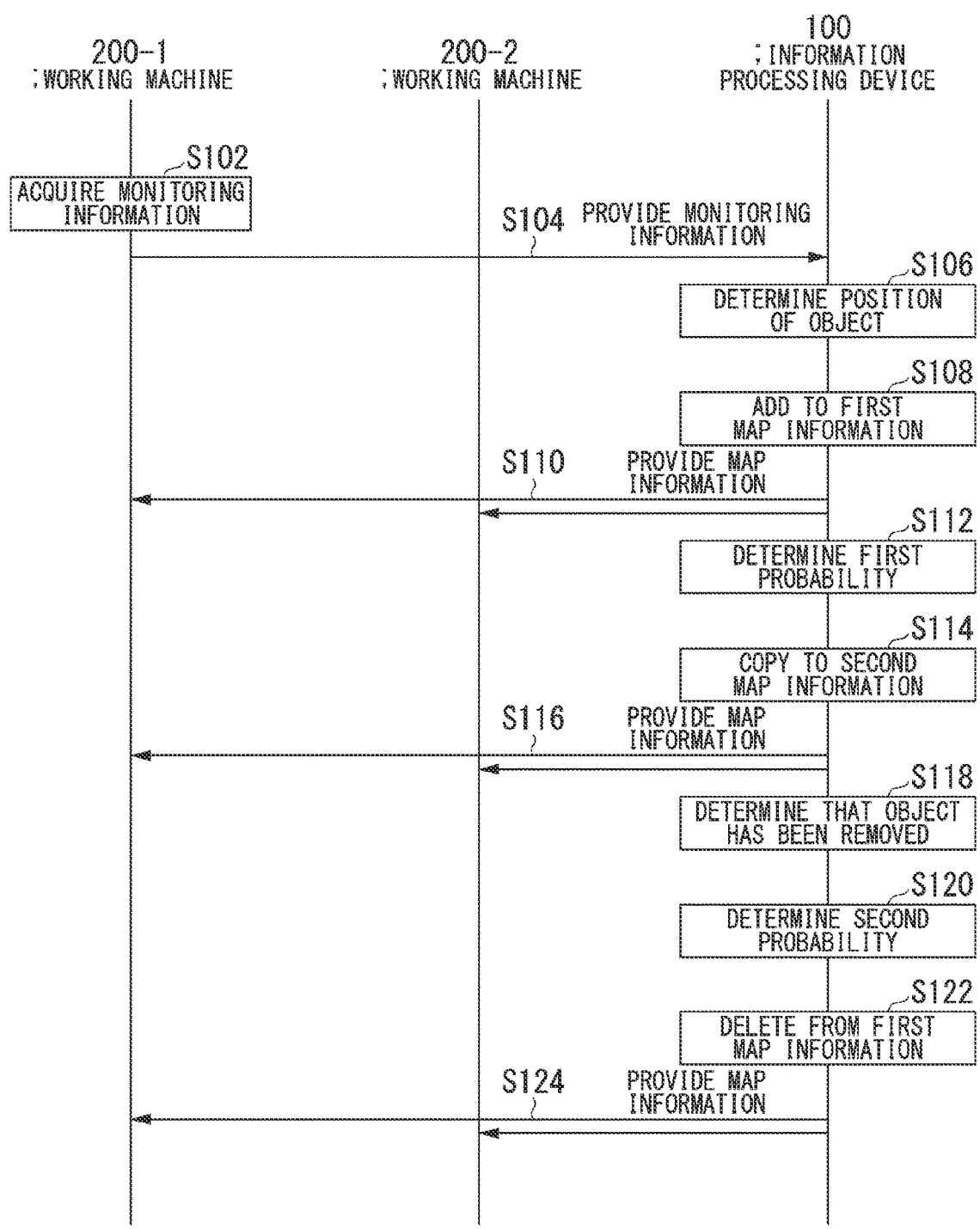
FIG. 7 is a sequence diagram illustrating an example of an information providing process according to the first embodiment.

An example of an information providing process according to this embodiment will be described below. FIG. 7 is a sequence diagram illustrating an example of the information providing process according to this embodiment. In FIG. 7, an example of a series of processes from a time point at which monitoring information is provided from one working machine 200-1 out of two working machines 200 to a time point at which map information is provided to the working machines 200-1 and 200-2 is illustrated. Here, it is assumed that the map information providing unit 128 transmits updated map information to the working machines 200-1 and 200-2 whenever a part of the map information is updated.

(Step S102) The ECU 42 of the working machine 200-1 acquires distance information indicating a distance to a nearby object from the distance sensor 36, position information indicating the position of the working machine from the encoder 34, and image data from the camera 38 as examples of the monitoring information acquiring unit.

(Step S104) The ECU 42 integrates the acquired distance information, the acquired position information, and the acquired image data as monitoring information in correlation with each other and transmits the integrated monitoring information to the information processing device 100 (provision of monitoring information). The collection unit 122 of the information processing device 100 receives the monitoring information from the working machine 200-1.

(Step S106) The object determining unit 124 detects a distance and a direction of an object which is present in a predetermined range from the distance sensor 36 serving as the monitoring information acquiring unit on the basis of the distance information included in the acquired monitoring information. The object determining unit 124 determines a position indicated by the detected distance the detected direction with respect to a reference point as a position at which an object is present with the position indicated by the position information as the reference point.

(Step S108) When a grid cell corresponding to the position at which the object is present is a grid cell for which object presence information is not set in the first map information at that time point, the map information managing unit 126 determines that the object associated with the position is a new object. The object determining unit 124 adds the object presence information indicating presence of the object for the grid cell to the first map information.

(Step S110) The map information providing unit 128 transmits the map information including the updated first map information and the second map information to the working machines 200-1 and 200-2.

The ECU 42 of each of the working machines 200-1 and 200-2 receives the map information from the information processing device 100 and starts route planning using the received map information.

(Step S112) The map information managing unit 126 determines a first probability in which an object is successively present at the same position on the basis of the first map information for each grid cell.

(Step S114) The map information managing unit 126 copies the object presence information for a grid cell in which the determined first probability is greater than a predetermined first probability to the grid cell in the second map information.

(Step S116) The map information providing unit 128 transmits the map information including the updated first map information and the updated second map information to the working machines 200-1 and 200-2.

The ECU 42 of each of the working machines 200-1 and 200-2 receives the map information from the information processing device 100 and starts route planning using the received map information.

(Step S118) When a grid cell corresponding to a position at which an object is not present is a grid cell for which object presence information indicating presence of an object is set in the first map information at that time point, the map information managing unit 126 determines that the object associated with the position has been removed. The object determining unit 124 updates the object presence information indicating absence of an object for the grid cell in the first map information.

(Step S120) The map information managing unit 126 determines a second probability in which an object is not successively present at the same position for each grid cell indicating absence of an object on the basis of the first map information.

(Step S122) The map information managing unit 126 deletes the object presence information for a grid cell in which the determined second probability is greater than a predetermined second probability from the first map information.

(Step S124) The map information providing unit 128 transmits the map information including the updated first map information and the second map information to the working machines 200-1 and 200-2.

The ECU 42 of each of the working machines 200-1 and 200-2 receives the map information from the information processing device 100 and starts route planning using the received map information.

The processes of Steps S102 to S124 in FIG. 7 may not be performed in that order as a whole. The processing orders in step groups of Steps S102 to S106, Steps S108 to S110, Steps S112 to S116, and Steps S120 to S124 are arbitrary and may be performed asynchronously. The map information providing unit 128 may transmit the updated map information to the working machines 200-1 and 200-2 whenever a part of the map information is updated on the basis of the monitoring information provided from the working machine 200-2.

Second Embodiment

A second embodiment of the invention will be described below. The same elements as in the aforementioned embodiment will be referred to by the same reference signs and description thereof will not be repeated unless otherwise mentioned. In the following description, differences from the aforementioned embodiment will be mainly described.

Figure 8:
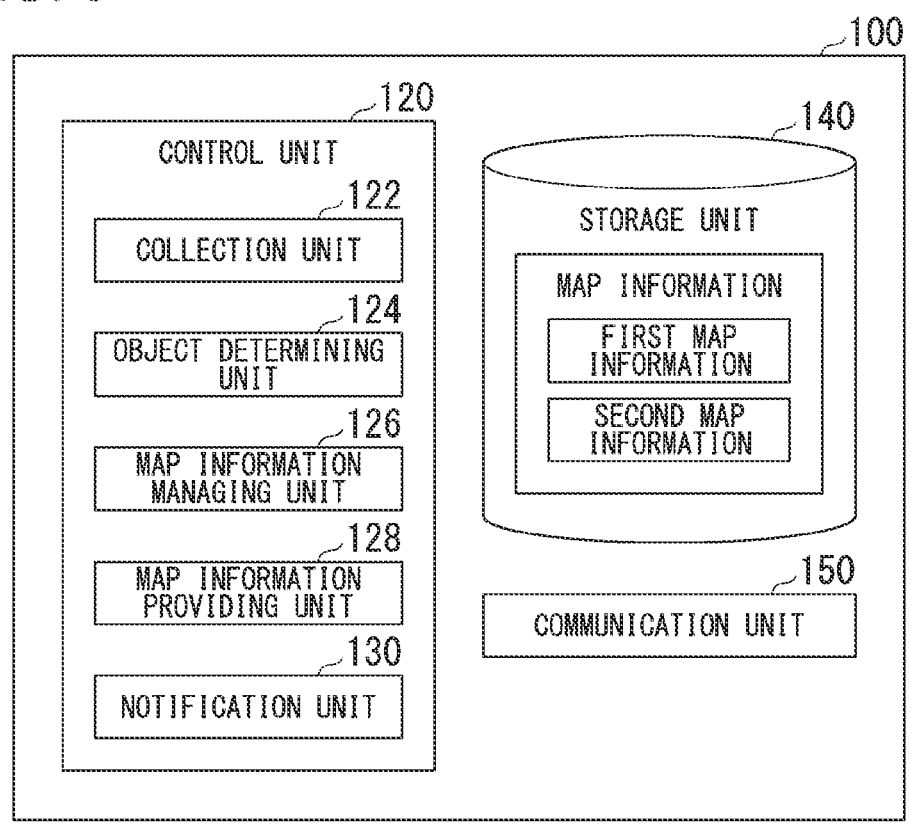
FIG. 8 is a block diagram illustrating an example of a functional configuration of an information processing device according to a second embodiment.

FIG. 8 is a block diagram illustrating an example of a functional configuration of an information processing device 100 according to this embodiment.

In the information processing device 100 according to this embodiment, the control unit 120 further includes a notification unit 130. The map information providing unit 128 outputs updated map information to the notification unit 130 when update of at least a part of the map information is detected.

Figure 9:
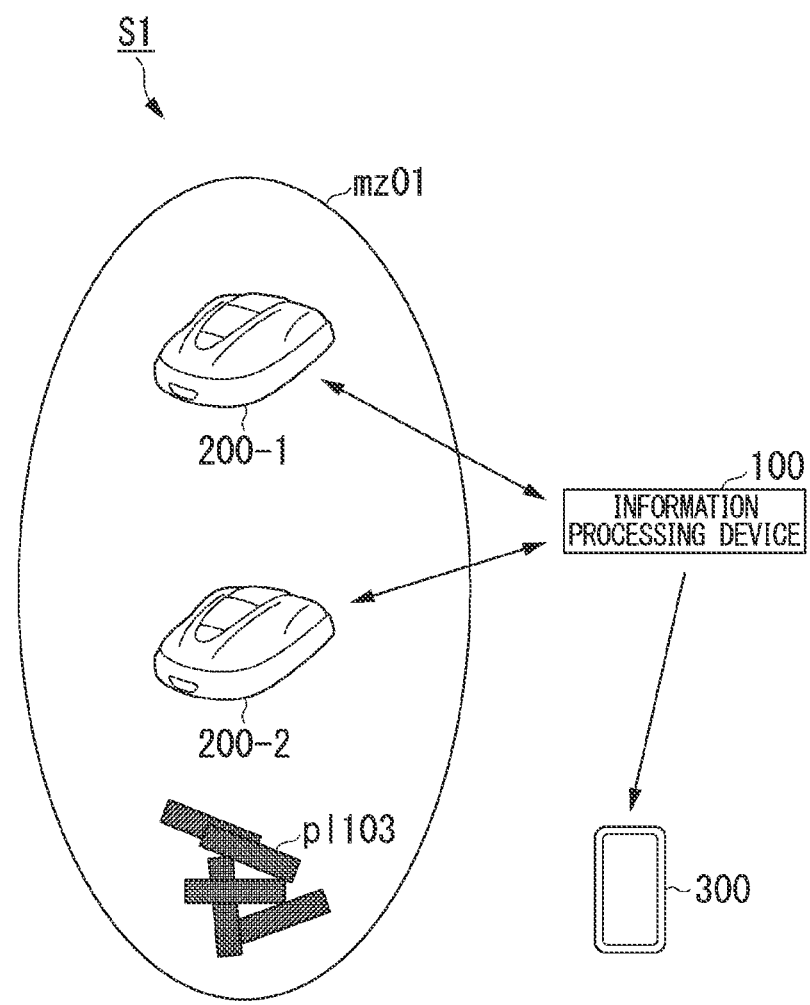
FIG. 9 is a diagram illustrating an example in which the information processing device according to the second embodiment provides notification information.

The notification unit 130 generates notification information on an object indicated by the map information on the basis of the map information input from the map information providing unit 128, and transmits the generated notification information to a predetermined device using the communication unit 150. In the example illustrated in FIG. 9, a device which is a transmission destination is a terminal device 300. The terminal device 300 is an information communication device that is mainly used by a manager of a monitoring area. The terminal device 300 may be, for example, one of a multifunction mobile phone (including a so-called smartphone), a tablet terminal device, and a personal computer.

The notification unit 130 determines a quantity of an object in the monitoring area on the basis of object presence information for each grid cell indicated by first map information of the map information. More specifically, the notification unit 130 counts the number of grid cells (hereinafter referred to as a grid cell number) for which the object presence information indicates presence of an object, and generates notification information indicating an abnormality of the quantity of an object when the counted grid cell number is greater than a predetermined reference value for the grid cell number. The grid cell number can be used as an index indicating an area indicated by the object in the monitoring area, that is, the quantity of the object which is present in the monitoring area.

The notification unit 130 may calculate a reference quantity of an object in the monitoring area on the basis of position information for each grid cell indicated by the second map information. More specifically, the notification unit 130 counts the grid cell number indicating presence of an object in the position information for each grid cell indicated by the second map information as a reference quantity. The notification unit 130 may calculate a difference from the reference quantity on the basis of the grid cell number based on the first map information and generate notification information indicating an abnormality of the quantity of an object when the calculated difference is greater than a predetermined reference value for the difference. The notification unit 130 transmits the generated notification information to a predetermined device.

The device which is a transmission destination (for example, the terminal device 300) presents the notification information received from the information processing device 100. Accordingly, an abnormality of the quantity of the object in the monitoring area is delivered to a user of the device which is a transmission destination.

Regarding a new object which has not been present in the previous first map information, the notification unit 130 may determine whether attributes of an object indicated by attribute information included in object position information input from the object determining unit 124 are predetermined attributes to be notified. The notification unit 130 can determine that an object of which presence is indicated by the object presence information set for a grid cell for which the object presence information has not been included in the previous first map information in the object presence information included in the newest first map information is a new object. When attributes of an object indicated by the attribute information are determined to be specific attributes to be notified, the notification unit 130 transmits the notification information indicating at least the position of the object to a predetermined device which is a transmission destination (for example, the terminal device 300). As the attributes to be notified, a type of an object with a high likelihood of being a lost article such as a toy or a purse against a carrier's intention can be set in advance in the notification unit 130. The notification information may include information indicating attributes of the object. Accordingly, a position at which the object with attributes to be notified (an object p1103 in the example illustrated in FIG. 9) is newly detected in the monitoring area is delivered to a user of the device which is a transmission destination.

The device which is a transmission destination of the notification information may transmit the notification information to a predetermined server device that enables transmission of various types of information to a device accessing the server device via a network. The predetermined server device is, for example, a social networking service (SNS) server or a web server. The SNS server is a device which belongs to the same user group as the information processing device 100 and can provide notification information to another device accessing the SNS server. The web server can provide the notification information to another unspecified device accessing the web server. Accordingly, the map information managing unit 126 can notify a user of another device of a notification object which is present at that position via the server device. The terminal device 300 can also serve as another device.

Third Embodiment

A third embodiment of the invention will be described below. The same elements as in the aforementioned embodiment will be referred to by the same reference signs and description thereof will not be repeated unless otherwise mentioned. In the following description, differences from the aforementioned embodiment will be mainly described.

Figure 10:
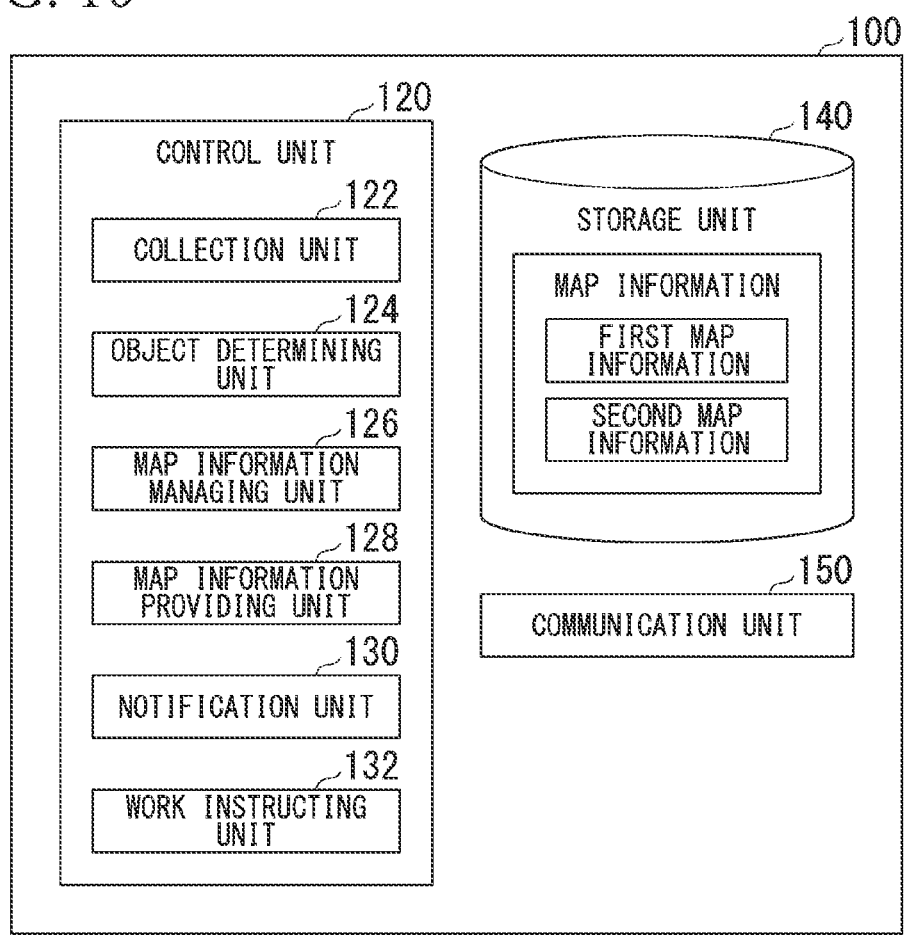
FIG. 10 is a block diagram illustrating an example of a functional configuration of an information processing device according to a third embodiment.

FIG. 10 is a block diagram illustrating an example of a functional configuration of an information processing device 100 according to this embodiment.

In the information processing device 100 according to this embodiment, the control unit 120 further includes an operation instructing unit 132. The map information providing unit 128 outputs updated map information to the operation instructing unit 132 when update of at least a part of the map information is detected. The control unit 120 illustrated in FIG. 10 includes the notification unit 130, but the notification unit 130 may be omitted in this embodiment.

Figure 11:
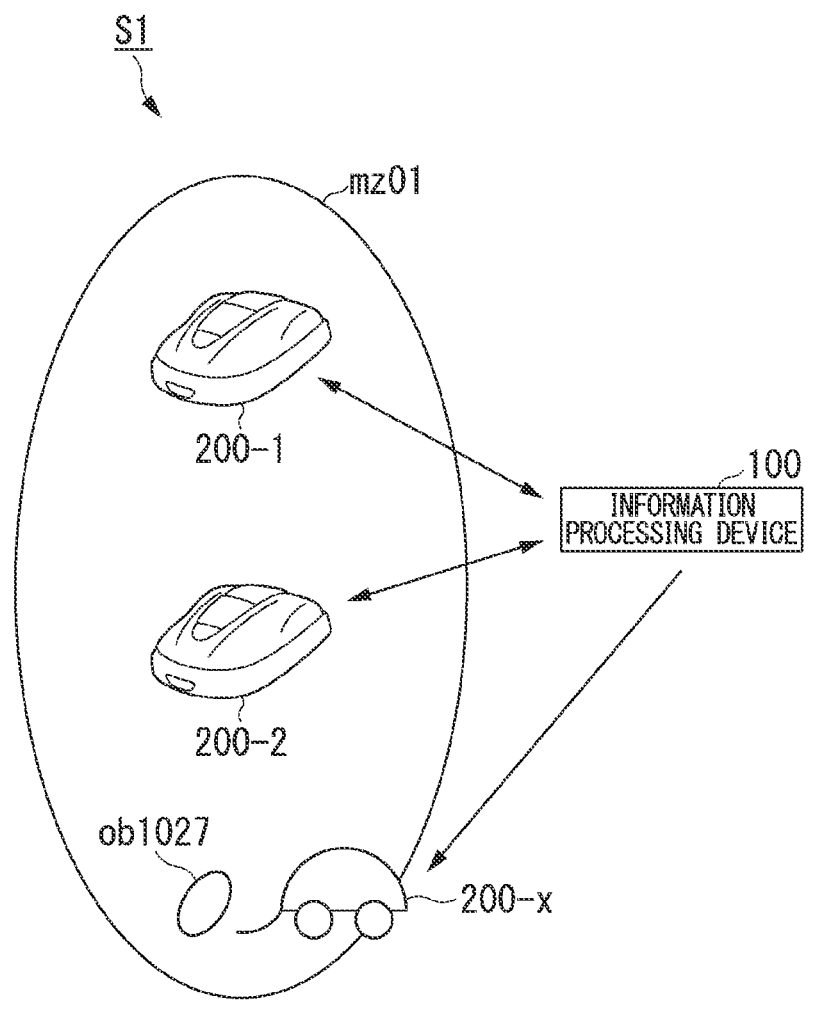

Regarding a new object which has not been present in the previous first map information, the operation instructing unit 132 determines whether attributes of an object indicated by attribute information included in object position information input from the object determining unit 124 are predetermined attributes to be removed. The operation instructing unit 132 can determine a new object using the same method as in the notification unit 130. When the attributes are determined to be specific attributes to be removed, the operation instructing unit 132 may transmit position information indicating a position of an object with the attributes and a control signal for instructing removal of the object to a working machine 200-x (FIG. 11) having a function of removing an object. As the attributes to be removed, for example, a size of an object which can be removed by the working machine may be set in the operation instructing unit 132. The working machine 200-x is, for example, a scavenging machine (a sweeper) including a working tool for sucking or removing an object which is left on a traveling route thereof. When two or more working machines 200, not one working machine 200, having a removal function are provided in the monitoring area, the operation instructing unit 132 may acquire monitoring information for each working machine 200 from the collection unit 122 and determine a working machine 200-x of which a position indicated by position information included in the acquired monitoring information is closest to the object as a transmission destination of the control signal. The ECU 42 of the working machine 200-x sets the position indicated by the control signal received from the information processing device 100 as a target position, determines a moving route from the current position to the set target position, and controls rotation of the rear wheel 14b such that the working machine travels along the determined moving route. As illustrated in FIG. 11, the ECU 42 can remove an object ob1027 which is left at the target position when the position of the working machine reaches the target position.

When work indicated by the control signal, that is, removal of the object ob1027, ends, the ECU 42 may transmit a work end notification indicating end of the work to the information processing device 100. When the work end notification is received from the working machine 200-x, the operation instructing unit 132 of the information processing device 100 determines ends of the work indicated by the transmitted control signal and outputs an object removal notification indicating the position of the object associated with the work and removal of the object to the map information managing unit 126.

When the object removal notification is input from the operation instructing unit 132, the map information managing unit 126 may update the first map information by removing the object presence information set for the grid cell corresponding to the position indicated by the input object removal notification. Accordingly, the object presence information associated with the object removed in accordance with an instruction from the operation instructing unit 132 is deleted from the first map information immediately after the object has been removed. Accordingly, it is possible to use the position of the removed object as a candidate for the moving route of the working machine 200 without determining whether the object presence information of the first map information is to be deleted on the basis of the second probability.

As described above, the information processing device 100 according to the aforementioned embodiments include the collection unit 122 configured to collect monitoring information indicating circumstances of a monitoring area from a plurality of monitoring information acquiring units, the object determining unit 124 configured to detect an object which is located in the monitoring area on the basis of the monitoring information, the map information managing unit 126 configured to update map information of the monitoring area using position information indicating a position of the object, and the map information providing unit 128 configured to provide the map information to a working machine 200 that performs predetermined work in the monitoring area. The information processing system Si according to the aforementioned embodiments includes the information processing device 100 and a plurality of monitoring information acquiring units, and each of two or more working machines 200 may include one of the plurality of monitoring information acquiring units. With this configuration, map information is updated on the basis of the monitoring information collected from the monitoring information acquiring units provided in the two or more working machines, and the updated map information is provided to the individual working machines. Even a working machine 200 including only one monitoring information acquiring unit acquires map information which is updated on the basis of the monitoring information acquired from the monitoring information acquiring unit provided in another working machine. Since the working machine can detect presence of an object which cannot be detected by the working machine using the acquired map information, it is possible to secure safety without decreasing work efficiency of the working machine.

In the information processing device 100, the map information may include first map information and second map information, and the map information managing unit 126 may add the position information of a newly detected object to the first map information, determine a first probability of the object being successively detected at the same position, copy the position information of an object for which the determined first probability is higher than a predetermined reference value for the first probability from the first map information to the second map information, determine a second probability of the object not being successively detected at the same position, and delete position information of an object for which the second probability is higher than a predetermined reference value for the second probability from the first map information. With this configuration, position information of an object having a likelihood of being successively present at the same position in the monitoring area is stored in the second map information and position information of an object which is temporarily present is stored in the first map information. Even when an object is not temporarily detected, the position information thereof is not immediately deleted from the map information. Accordingly, a likelihood of presence of the object is exhibited, and the likelihood of presence of the object is deleted when it is determined that the object is not present. As a result, it is possible to improve safety of a working machine that moves using the first map information and the second map information.

The object determining unit 124 may determine attributes of an object which is detected on the basis of the monitoring information, and the map information managing unit 126 may determine the first probability or the second probability on the basis of the determined attributes. With this configuration, a likelihood that an object will be successively present at the same position or a likelihood that the object will not be successively present at the same position is evaluated depending on a type of the object. Accordingly, map information is updated on the basis of the likelihood of presence or absence of an object depending on the type of the object.

The information processing device 100 may further include the operation instructing unit 132 configured to cause a predetermined working machine (for example, the working machine 200-*x*) to remove the detected object when the object of which attributes have been determined is a predetermined object with attributes to be removed. With this configuration, when an object to be removed is detected, the object is removed. Accordingly, since a position from which the object has been removed is restored as a candidate for a moving route of a working machine 200, it is possible to improve work efficiency of the working machine 200.

The information processing device 100 may further include the notification unit 130 configured to notify a predetermined working machine of notification information indicating at least position information of the object when the object of which attributes have been determined is a predetermined notification object. With this configuration, notification information indicating a position of a predetermined notification object is delivered to a user (for example, a manager) of a machine who is a notification recipient. Since the user who is a notification recipient can understand the notification information of the object detected at the notified position, it is possible to improve work efficiency associated with management of a monitoring area.

The information processing device 100 may further include the notification unit 130 configured to determine a quantity of an object which is detected in the monitoring area on the basis of the first map information and to output notification information indicating an abnormality of the quantity of the object when the quantity of the detected object is greater than a predetermined reference quantity. With this configuration, notification information indicating an abnormality of a quantity of an object detected in the monitoring area is delivered to a user of a machine who is a determined notification recipient (for example, a manager). Since the user who is a notification recipient can understand the abnormality of the quantity of the object in a management area, it is possible to improve work efficiency associated with management of a monitoring area.

At least one of the plurality of monitoring information acquiring unit may be an imaging unit (for example, the camera 38 or a camera 400 (which will be described later)) configured to capture an image of the monitoring area. With this configuration, it is possible to analyze circumstances of a monitoring area in more detail using an image captured in the monitoring area regardless of the monitoring information (for example, the distance information and the position information) which is provided from the monitoring information acquiring unit of a working machine 200.

While embodiments of the invention have been described above with reference to the drawings, specific configurations of the invention are not limited thereto and various modifications in design or the like can be carried out without departing from the gist of the invention.

Figure 12:
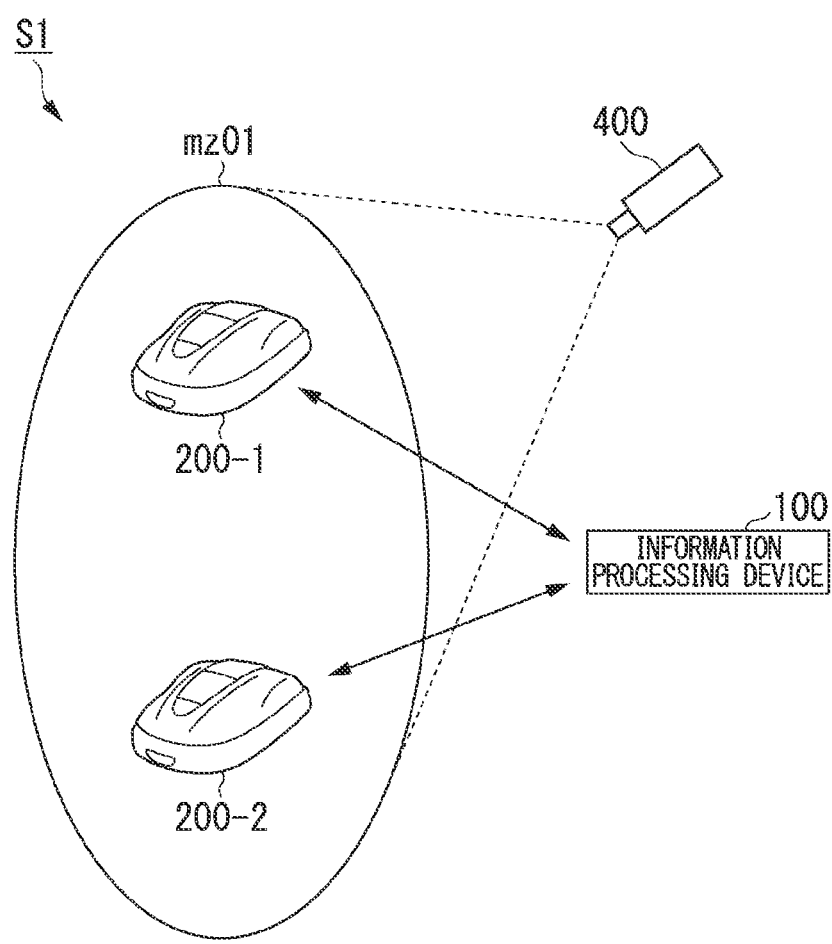
FIG. 12 is a diagram illustrating another example of the information processing system according to the embodiments.

For example, in the information processing system 51, a camera 400 may be provided as some or all of the monitoring information acquiring units as illustrated in FIG. 12. The camera 400 has a visual field including a partial or whole area of the monitoring area mz01 and transmits image data of an image indicating circumstances of the area as monitoring information to the information processing device 100. The number of cameras 400 is not limited to one and may be two or more. Assignment of imaging areas corresponding to the visual fields in which the two or more cameras 400 capture an image into the monitoring area may be set in advance or may be variable. The position or the imaging area of each camera 400 may be fixed or variable. In order to set the imaging area to be variable, the camera 400 may include a mobile member and a position information acquiring unit and transmit position information indicating a position of the camera to the information processing device 100 in correlation with image data of an image captured at that time point. The collection unit 122 of the information processing device 100 can specify a predetermined visual field of a camera 400 with the position indicated by the position information as a viewing point as an imaging area of the camera 400 on the basis of the position indicated by a positional state received from the camera 400 in correlation with image data.

In the information processing system Si, at least some of the monitoring information acquiring units may be a server device that can transmit news information indicating news about the monitoring area using a network. The server device may be one of an SNS server and a web server. The collection unit 122 of the information processing device 100 acquires the news information as a part of the monitoring information from the server device and outputs the acquired news information to the object determining unit 124. The object determining unit 124 may extract information on an object located in the monitoring area as object information from the news information input from the collection unit 122.

For example, the object determining unit 124 performs known morpheme analysis on text information constituting the news information, identifies a target subject name for identifying a predetermined position in the monitoring area and an object name which is a name of an object with predetermined attributes, and identifies a part in which both the target subject name and the object name are included in a predetermined range (for example, sentences or paragraphs). For example, for each name or each alias of each target subject (including a so-called landmark) of which the position is identified such as a section name, a facility name, a structure, a tree, or a land feature as the target subject name, target subject data indicating a position in the monitoring area is set in advance in the object determining unit 124. For each name or each alias of an object which may cause hindrance of movement or work of a working machine 200 as the object name, obstacle data indicating attributes of the object is set in advance in the object determining unit 124. The object determining unit 124 can identify an area in a predetermined range from a position corresponding to the extracted target subject name with reference to the target subject data. The object determining unit 124 can identify attributes of the object with reference to the obstacle data. The object determining unit 124 outputs object position information indicating presence of an object at each position in the identified area and including attribute information indicating the identified attributes to the map information managing unit 126. Accordingly, a position and attributes of an object in the monitoring area mentioned in news which can be transmitted using the server device can be identified and can be reflected in the first map information by the map information managing unit 126. As a result, it is possible to control movement of a working machine 200 on the basis of circumstances of an object mentioned in news.

The information processing device 100 may be constituted as a single information processing device or working machine which is unified with at least one working machine 200 and a processor of the ECU 42 may have the function of the control unit 120. In this case, transmission of various types of data between the control unit 120 and the constituent units of the working machine 200 are input and output inside a single device, and a redundant element or process, for example, the communication unit 64, may be omitted by the unification.

In the working machine 200, the camera 38 may be omitted. When information of a reference point for determining the position of the encoder 34 can be acquired, the GPS 37 may be omitted. The working machines 200 are not limited to the lawn mowers and may be any machine as long as it can perform route planning using map information and perform predetermined work while traveling autonomously along the determined moving route, such as a weeding machine that performs weeding, a scavenging machine that recovers or removes a small object, or a sweeper that sweeps a surface of an object or a traveling area.

What is claimed is:

1. An information processing device comprising:
 a processor configured to:
  collect monitoring information indicating circumstances of a monitoring area from a plurality of sensor devices;
  detect an object which is located in the monitoring area based on the monitoring information;
  update map information of the monitoring area using position information indicating a position of the object;
  provide the map information to a working machine that performs predetermined work in the monitoring area,
  determine a second period of the object not being successively detected at the same position;
  delete position information of an object for which the second period is higher than a predetermined reference value for the second period from the map information;
  perform a route planning of the working machine to avoid the object until the position information of the object has been deleted from the map information due to the second period becoming higher than the predetermined reference value for the second period; and
  based on the route planning of the working machine, cause the working machine to move and perform a function associated with the working machine within the monitoring area and to avoid the object until the position information of the object has been deleted from the map information.

2. The information processing device according to claim 1, wherein the map information includes first map information and second map information, and
 wherein the processor is configured to:
  add the position information of a newly detected object to the first map information;
  determine a first probability of the object being successively detected at the same position;
  copy the position information of an object for which the first probability is higher than a predetermined reference value for the first probability from the first map information to the second map information;
  determine a second probability of the object not being successively detected at the same position; and
  delete position information of an object for which the second probability is higher than a predetermined reference value for the second probability from the first map information.

3. The information processing device according to claim 2, wherein the processor is configured to determine attributes of an object which is detected based on the monitoring information, and
 determine the first probability or the second probability based on the attributes.

4. The information processing device according to claim 3, wherein the processor is further configured cause a predetermined working machine to remove the object when the object is a predetermined object to be removed.

5. The information processing device according to claim 3, wherein the processor is further configured to notify a predetermined working machine of notification information indicating at least a position of the object when the object is a predetermined notification object.

6. The information processing device according to claim 2, wherein the processor is further configured to:
 determine a group of objects which are detected in the monitoring area based on the first map information; and
 output notification information indicating an abnormality of the group of the objects when the group of the objects is greater than a predetermined reference quantity.

7. An information processing system comprising:
 the information processing device according to claim 1; and
 the plurality of sensor devices,
 wherein each of two or more working machines includes one of the plurality of sensor devices.

8. The information processing system according to claim 7, wherein at least a group of the plurality of sensor devices are image capture devices configured to capture an image of the monitoring area.

9. An information processing method which is performed by an information processing device, the information processing method comprising:
- collecting monitoring information indicating circumstances of a monitoring area from a plurality of sensor devices;
- detecting an object which is located in the monitoring area based on the monitoring information;
- updating map information of the monitoring area using position information indicating a position of the object;
- providing the map information to a working machine that performs predetermined work in the monitoring area;
- determining a second period of the object not being successively detected at the same position;
- deleting position information of an object for which the second period is higher than a predetermined reference value for the second period from the map information;
- performing a route planning of the working machine to avoid the object until the position information of the object has been deleted from the map information due to the second period becoming higher than the predetermined reference value for the second period; and
- based on the route planning of the working machine, causing the working machine to move and perform a function associated with the working machine within the monitoring area and to avoid the object until the position information of the object has been deleted from the map information.

10. The information processing device according to claim 1,
wherein the map information includes first map information and second map information, and
wherein the processor is further configured to:
- when the object presence information included in the first map information for a grid cell corresponding to an absence position indicated by the object presence information input from the object indicating a presence of the object,
- determine that the object has been removed from the grid cell; and
- change the object presence information to object presence information including absence of the object in the grid cell and information on the date and time at which the object has been determined to be removed as removal date and time.

11. The information processing device according to claim 1,
wherein the map information includes first map information and second map information, and
wherein the processor is further configured to:
- add the position information of a newly detected object to the first map information;
- determine a first period of the object being successively detected at the same position;
- copy the position information of the object for which the first period is higher than a predetermined reference value for the first period from the first map information to the second map information.

12. The information processing device according to claim 1,
wherein the position of the object is determined based on a shape of the object delineated as a representative dot density associated with the object and a defined presence period during which the representative dot density is situated in the monitoring area.

* * * * *